(12) United States Patent
Mathieu (10) Patent No.: US 9,343,214 B2
(45) Date of Patent: May 17, 2016

(54) MAGNETIC ARTICLE HOLDER (71) Applicant: Ryan Mathieu, Langley, CA (US)

(72) Inventor: Ryan Mathieu, Langley, CA (US)

( * ) Notice: Subject to any disclaimer, the term of this patent is extended or adjusted under 35 U.S.C. 154(b) by 0 days.

(21) Appl. No.: 14/592,956

(22) Filed: Jan. 9, 2015

(65) Prior Publication Data
US 2015/0200045 A1    Jul. 16, 2015

Related U.S. Application Data

(60) Provisional application No. 61/925,702, filed on Jan. 10, 2014.

(51) Int. Cl.
*H01F 7/02*    (2006.01)
*A45F 5/00*    (2006.01)
*A41D 13/00*    (2006.01)

(52) U.S. Cl.
CPC .......... *H01F 7/0252* (2013.01); *A41D 13/0012* (2013.01); *A45F 5/00* (2013.01); *A44D 2203/00* (2013.01)

(58) Field of Classification Search
CPC . H01F 7/0252; H01F 7/0215; A41D 13/0012; A45F 5/00; A45C 11/24; A45C 13/02; A45C 3/00; B25H 3/00; Y10S 224/904; Y10S 211/01; Y10S 206/818; Y10S 224/907
See application file for complete search history.

(56) References Cited

U.S. PATENT DOCUMENTS

| | | | |
|---|---|---|---|
| 2,597,601 A * | 5/1952 | Sherman | A42B 1/24 2/175.3 |
| 3,886,508 A | 5/1975 | Lavrard | |
| 3,943,912 A * | 3/1976 | Nakayama | A61F 5/03 600/15 |
| 4,373,629 A * | 2/1983 | Ulin | A45C 11/24 206/350 |
| 4,826,059 A | 5/1989 | Bosch et al. | |
| 5,022,521 A * | 6/1991 | Kane | A61B 19/0264 206/370 |
| 5,604,960 A | 2/1997 | Good | |
| 5,707,333 A * | 1/1998 | Bakst | A61N 2/06 600/15 |
| 6,049,914 A | 4/2000 | Heilman | |
| 6,530,508 B1 * | 3/2003 | Devine | A45F 5/00 224/183 |
| 8,403,140 B2 | 3/2013 | Woolery | |
| 2004/0173484 A1 | 9/2004 | Bates et al. | |
| 2006/0016841 A1 * | 1/2006 | Shurm | A45F 5/00 224/222 |
| 2009/0094801 A1 | 4/2009 | Woolery | |
| 2009/0178245 A1 | 7/2009 | Albert | |
| 2010/0269239 A1 | 10/2010 | Kulp et al. | |
| 2010/0313329 A1 | 12/2010 | Haynes | |

FOREIGN PATENT DOCUMENTS

| | | |
|---|---|---|
| CA | 2284650 A1 | 9/1999 |
| CA | 2638340 A1 | 2/2010 |
| CA | 2686178 A1 | 5/2011 |

* cited by examiner

*Primary Examiner* — Mohamad Musleh (57) ABSTRACT

A magnetic article holder includes a first flexible panel, a second flexible panel, a plurality of pockets, a plurality of magnets, and a plate. The first flexible panel has a first outer surface and a first inner surface opposite to the first outer surface. The second flexible panel has a second outer surface and a second inner surface opposite to the second outer surface. The pockets are defined between the first inner surface and the second outer surface. The pockets are at least partially isolated from one another. The magnets are each respectively positioned in one of the plurality of pockets. The plate is spaced from the first outer surface. The plate is magnetically engaged with each of the first plurality of magnets.

16 Claims, 6 Drawing Sheets

MAGNETIC ARTICLE HOLDER

CROSS-REFERENCE TO RELATED APPLICATIONS

This application claims the benefit of U.S. Provisional Patent Application Ser. No. 61/925,702 for a MAGNETIC TOOL HOLDER, filed on 10 Jan. 2014, which is hereby incorporated by reference in its entirety.

BACKGROUND

1. Field

The invention relates to a magnetic holding or retaining arrangement, such as for tools and other metallic articles.

2. Description of Related Art

U.S. Pat. No. 3,886,508 discloses a MAGNETIC TOOL HOLDER. In the '508 patent, a garment carries a flexible sheet on which rod magnets are arranged in spacedly parallel relationship to define a supporting area longer and wider than 2 inches. Notches in the magnet surfaces assist in preventing movement of magnetically attracted ferrous tools. The sheet may be mounted on any part of a garment remote from the hands, and held to the body of the wearer by loops which extend about the trunk of the wearer, one or more limbs, and/or the neck of the wearer.

SUMMARY

A magnetic article holder includes a first flexible panel, a second flexible panel, a plurality of pockets, a plurality of magnets, and a plate. The first flexible panel has a first outer surface and a first inner surface opposite to the first outer surface. The second flexible panel has a second outer surface and a second inner surface opposite to the second outer surface. The pockets are defined between the first inner surface and the second outer surface. The pockets are at least partially isolated from one another. The magnets are each respectively positioned in one of the plurality of pockets. The plate is spaced from the first outer surface. The plate is magnetically engaged with each of the first plurality of magnets.

BRIEF DESCRIPTION OF THE DRAWINGS

The detailed description set forth below references the following drawings.

DETAILED DESCRIPTION OF EXEMPLARY EMBODIMENT

A plurality of different embodiments of the present disclosure is shown in the Figures of the application. Similar features are shown in the various embodiments of the present disclosure. Similar features have been numbered with a common reference numeral, upper-case letter, or both. Similar features in the different embodiments have been differentiated by a lower-case alphabetic suffix. Also, to enhance consistency, the structures in any particular drawing share the same alphabetic suffix even if a particular feature is shown in less than all embodiments. Similar features in a particular embodiment have been numbered with a common two-digit, base reference numeral and have been differentiated by a different leading numeral. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The present disclosure, as demonstrated by the exemplary embodiments described below, can provide an article holder that can be worn by a user. The article holder can magnetically hold tools, fasteners, and other metallic articles. The magnetic article holder can include a plurality of magnets and a plate magnetically engaged with the magnets. The plate can link the magnets together in that each magnet can be supported against movement. For example, when a user attempts to remove an article magnetically engaged with a first magnet such as by twisting or rotating the article, the first magnet will be supported against movement by the plate. In prior art devices, magnets are arranged only in cloth. Each magnet is moveable relative to other magnets because only cloth supports the magnets.

Figure 1:
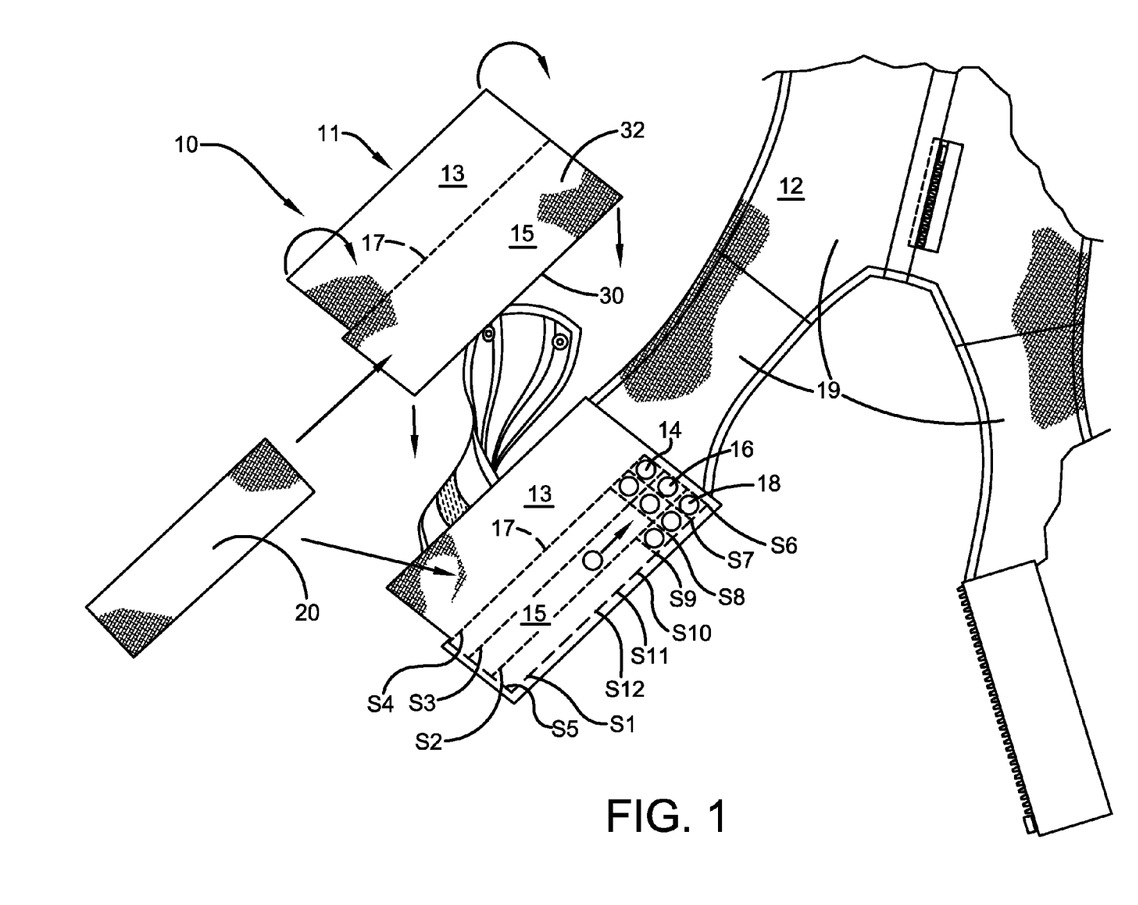
FIG. 1 is a first perspective and partially-exploded view of an exemplary embodiment of the present disclosure.

FIG. 1 is a first perspective view of a first exemplary embodiment of the present disclosure. A magnetic article holder 10 can include a blank 11. In FIG. 1, the blank 11 is shown above in an unaltered condition and is also shown partially mounted on a vest 12. The blank 11 can be a sheet of flexible material, such as fabric or plastic. The blank 11 can include flexible panels 13 and 15. A fold line 17 can be defined between the flexible panels 13 and 15.

The vest 12 can be formed from a flexible panel of material. The material of the vest 12 can define a first flexible panel of the magnetic article holder 10 and the flexible panel 15 can define a second flexible panel of the magnetic article holder 10. The flexible panel 13 can define a third flexible panel of the magnetic article holder 10.

The exemplary flexible panels 13, 15 are integrally-formed with respect to one another and folded over one another along fold line 17. "Integrally-formed" refers to the fact that in the exemplary embodiment the panels 13, 15 are formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

In an exemplary first step for forming the magnetic article holder 10, the panel 15 can be connected to the vest 12 along stitch lines S1, S2, S3, S4, and S6. The fold line 17 can extend substantially collinear with the stitching S4 which interconnects the panel 15 and the vest 12. A first row of magnets can then be formed by moving magnets 14, 16, 18 into the respective positions shown in FIG. 1 and stitch line S7 can then be formed. A second row of magnets can then be formed by similarly moving magnets into respective positions and forming stitch line S8. Similarly, additional rows of magnets can be formed by moving magnets into respective positions and forming stitch lines S8, S9, S10, S11, S12, and so on up to stitch line S5, until the flexible panel 15 covers an array of magnets. The stitch lines S1-S12 and other stitch lines can define individual pockets that are least partially isolated from one another to hold magnets.

After the array of magnets is formed, a plate 20 can be placed on portion 15. The plate 20 can be formed from a ferro-magnetic material or from another type of metal. Portion 13 can be folded over portion 15 along fold line 17 and the plate 20 can be fixed in place by forming supplemental stitches along stitch lines S1, S5, and S6.

The various panels can be connected along various forms of perimeters. For example, the flexible panel 15 and the vest 12 can be affixed together along a substantially continuous perimeter. Also, the exemplary panels 13 and 15 are connected along a substantially continuous perimeter. Generally, a substantially continuous perimeter can define a closed loop. A substantially continuous perimeter can be defined by stitching or other processes. In stitching, small gaps can exist between stitches and the perimeter can be substantially continuous. Other processes can be applied for forming the perimeter. For example, thermal welding can be applied in other embodiments of the present disclosure. Adhesive can also be applied to form the perimeter. A single substantially continuous perimeter can be formed using multiple techniques. For example, a first portion of a substantially continuous perimeter can be formed with stitches and a second portion of the substantially continuous perimeter can be formed with a fold line, such as done between panels 13 and 15.

The flexible panels can be affixed together along a discontinuous perimeter. An example could be produced by forming panels 13 and 15 as separate structures and leaving open the edge currently defined by fold line 17. A discontinuous perimeter can be a perimeter that is substantially continuous along a portion of its length and include one or more gaps defined between one or more portions that are substantially continuous. For example, in an embodiment of the present disclosure, two flexible panels can be affixed together along three sides of a rectangle. The three sides define a portion of a discontinuous perimeter. The gap between two of the sides of the rectangle can also define a portion of the discontinuous perimeter and can define a discontinuity of the discontinuous perimeter. A discontinuous perimeter can be a desirable feature in that an object positioned between flexible panels and surrounded by a discontinuous perimeter can be selectively removed from between the flexible panels. For example, an embodiment of the present disclosure could be practiced similar to the embodiment shown in FIG. 1, but having the panels 13 and 15 be initially separate and only connected along stitch lines S1, S5 or S6. In another embodiment, the orientation of the blank 11 could be flipped so that the fold line 17 is aligned with stitch line S1. The sides of the panels 13, 15 opposite to the fold line 17 could remain unconnected so that the plate 20 could be selectively removable. A discontinuous perimeter can be defined by stitching or other processes.

Figure 2:
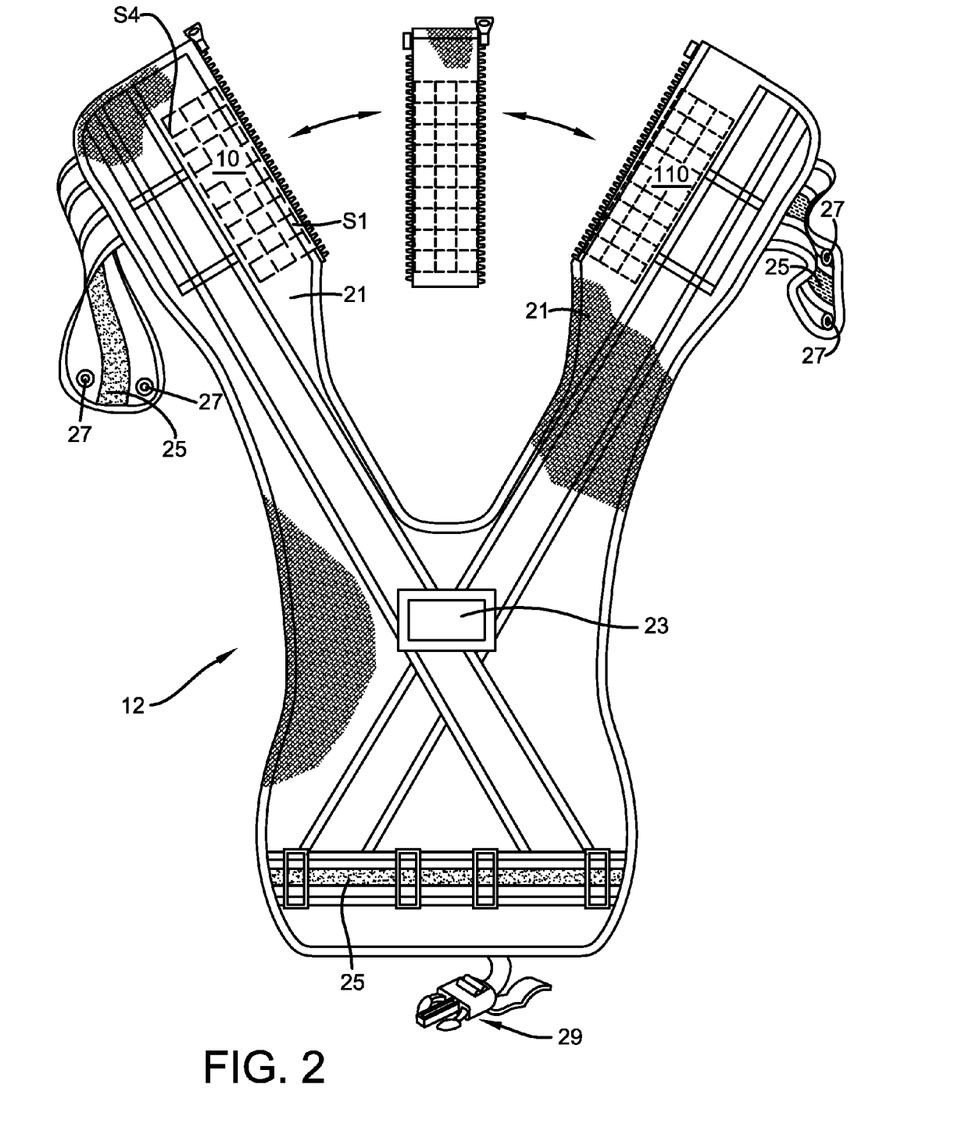
FIG. 2 is a second perspective view of the exemplary embodiment shown in FIG. 1.

A surface 19 of the vest 12 would be adjacent to the wearer's body. FIG. 2 is a second perspective view of the first exemplary embodiment of the present disclosure. A surface 21 of the vest 12 is opposite to the surface 19 and would be at least partially visible when the vest 12 is worn. The magnetic article holder 10 is integral with the vest 12 through the stitching S1-S12. The vest 12 also supports a second magnetic article holder 110. The magnetic article holders 10, 110 can be constructed to be substantially similar or different in one or more aspects.

Figure 3:
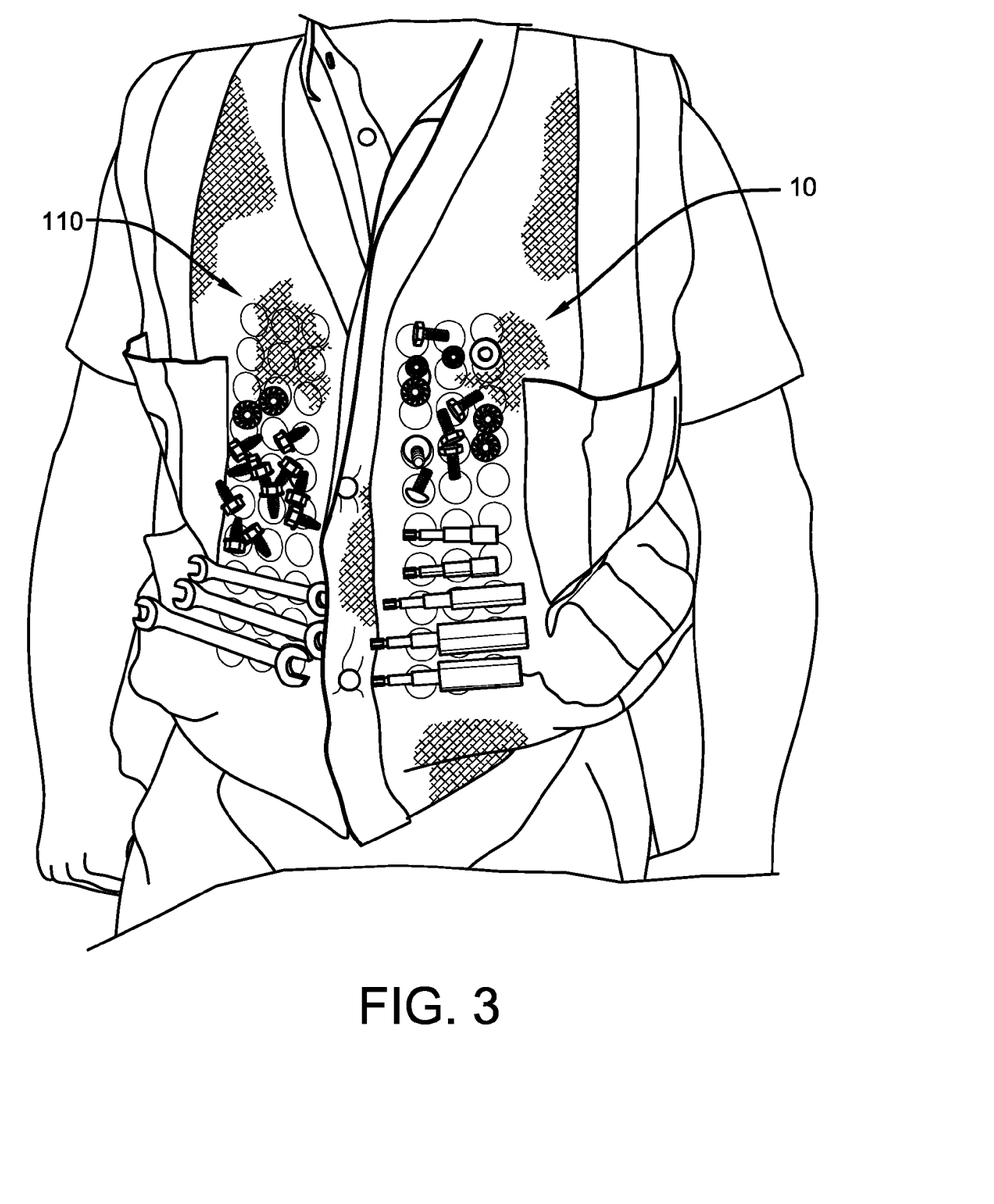
FIG. 3 is a third perspective view of the exemplary embodiment shown in FIG. 1 in operation.

The exemplary vest 12 can include other features. A zipper and/or access to a fall protection harness is referenced at 23. Side straps with hook and loop fasteners that allow the vest 12 to be worn by differently-sized users are referenced at 25. Eyelets on the ends of side straps 25 are referenced at 27. An adjustable belt clip to be looped around the belt of the wearer and allow the weight added by tools and the magnetic article holder to be balanced, front-to-back, on the user's body is referenced at 29. In addition to feature 29, belt loops or antithetical counterbalance components may be added to feature 25 or another portion of the vest 12 to accommodate tool pouches and tool attachments to counterbalance the weight added to the front of the magnetic tool holder 10. FIG. 3 is a third perspective view of the first exemplary embodiment of the present disclosure in operation, being worn by a user.

As set forth above, the exemplary magnetic article holder 10 includes a first flexible panel having a first outer surface and first inner surface opposite the first outer surface, wherein the first flexible panel is defined by the material of the vest 12, the first outer surface is defined by surface 21, and the first inner surface is defined by the surface 19. The exemplary magnetic article holder also includes a second flexible panel 15 having a second outer surface 30 and a second inner surface 32 opposite the second outer surface 30.

Figure 5:
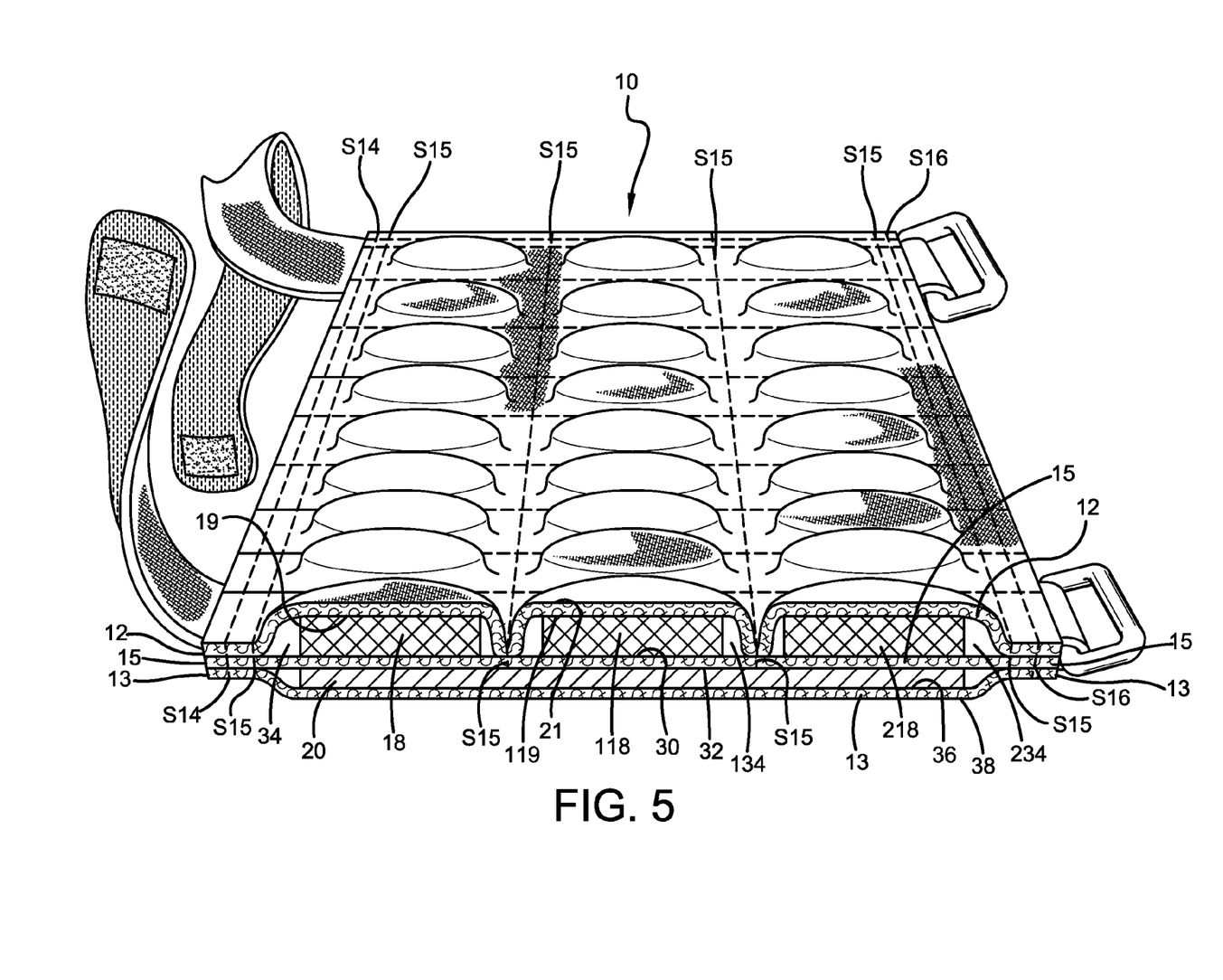
FIG. 5 is a cross-section through the exemplary embodiment shown in FIG. 1.

As best shown in FIG. 5, the exemplary magnetic article holder 10 can also include a plurality of pockets 34, 134, 234 defined between the first inner surface 19 and the second outer surface 30. Magnets are respectively positioned in one of the plurality of pockets 34, 134, 234. For example, the magnet 18 can be positioned in the pocket 34, a magnet 118 can be positioned in the pocket 134, and a magnet 218 can be positioned in the pocket 234. The plurality of pockets 34, 134, 234 are at least partially isolated from one another. For example, the magnet 18 can be restrained or captured in the pocket 34 and prevented from passing into the pocket 134. The pockets 34, 134, 234 can be at least partially isolated from one another by stitching. The plate 20 can be spaced from the first outer surface 21. The plate 20 is magnetically engaged with each of the magnets 18, 118. The magnetic field of the magnets 18, 118 induces fixing of the magnets 18, 118 to the plate 20. Flexible panel 13 defines a third flexible panel having a third outer surface 36 and third inner surface 38 opposite the third outer surface 36. The plate 20 can be positioned between the second inner surface 32 and the third outer surface 36.

FIG. 5 shows exemplary stitching S14 and S16 connecting the second flexible panel 15 and the third flexible panel 13. Exemplary stitching S14 and S16 also interconnects the first flexible panel 12, the second flexible panel 15, and the third flexible panel 13. Exemplary stitching S15 affixes the first flexible panel 12 and the second flexible panel 15 together. This allows the magnets 18, 118 to be supported against movement to the plate 20 as well as allowing magnets 18, 118 to be shift slightly across the plate 20 to move/attract around metallic articles.

Figure 4A:
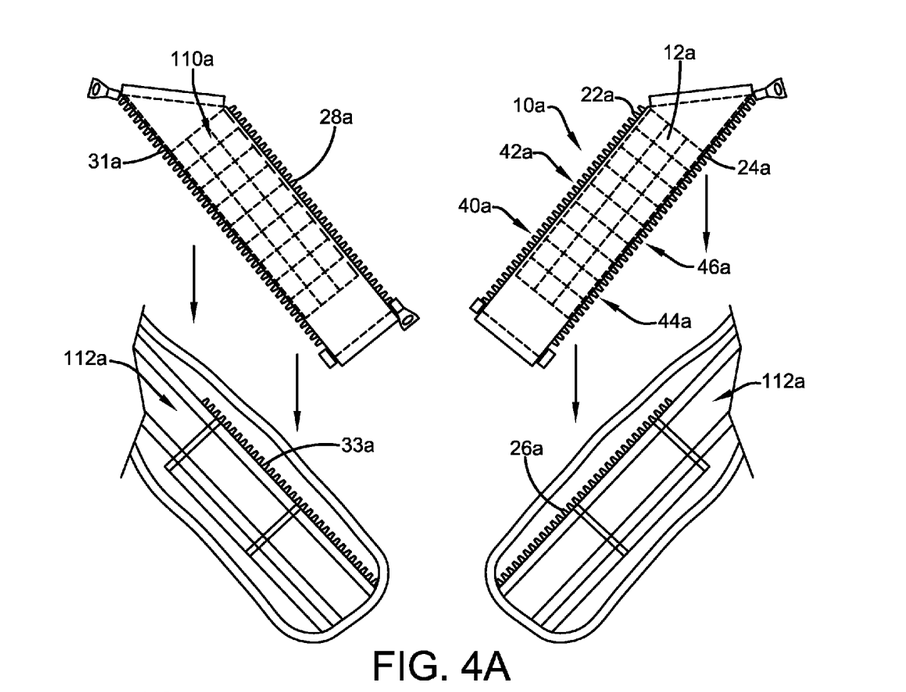
FIG. 4A is an exploded view of an additional exemplary embodiment of the present disclosure.
Figure 4B:
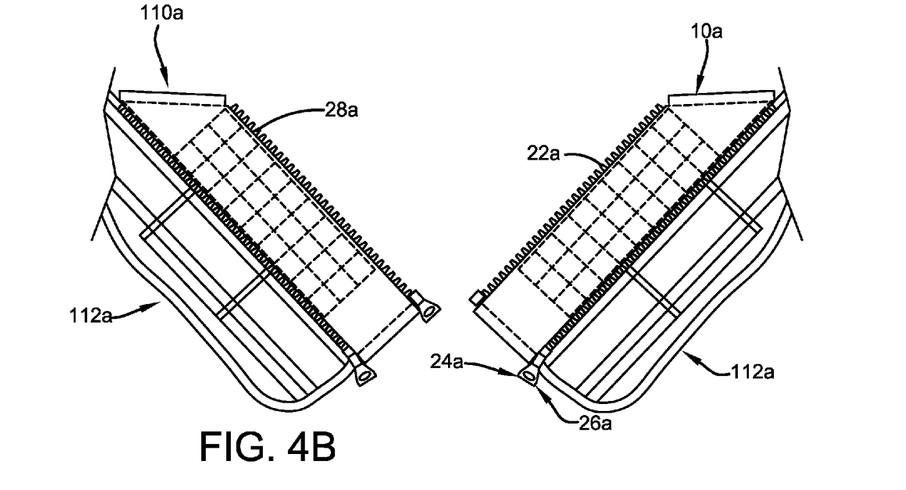
FIG. 4B is a perspective view of the exemplary embodiment shown in FIG. 4A is an assembled condition.

FIGS. 4A and 4B illustrate another embodiment. Magnetic article holders 10a, 110a have been constructed in a manner similar to the construction of magnetic article holder 10 in FIGS. 1-3. The magnetic article holder 10a has further been constructed to include zipper portions 22a, 24a. The magnetic article holder 10a can be releasibly mounted on a vest 112a by engaging the zipper portion 24a of the magnetic article holder 10a with a corresponding zipper portion 26a of the vest 112a. In one or more other embodiments of the present disclosure, a magnetic article holder can be configured to be mounted on a jacket, coveralls, overalls, and other kinds of work clothing.

It is noted that embodiments of the present disclosure can be removably engaged with articles of clothing so that washing of the articles of clothing can be easier and/or more convenient. Further, the embodiment can be easier to wash as well. The embodiment could be constructed to be cleanable using different methods than the method used to wash the article of clothing. For example, the embodiment could be sprayed with cleaning chemicals and hung dry while the article of clothing is subjected to machine washing and drying like other articles of clothing.

The magnetic article holder 110a has been constructed in a manner similar to the construction of magnetic article holder 10a. The magnetic article holder 110a can have further been constructed to include zipper portions, including a zipper portion 28a and a zipper portion 31a. The zipper portion 31a of magnetic article holder 110a can engage a zipper portion 33a of the vest 112a. When worn by a user, the vest 112a can be closed by engaging the zipper portion 28a of magnetic article holder 110a to zipper portion 22a of magnetic article holder 10a. If desirable, additional magnetic article holders can be added between zipper portions 28a and 22a to accommodate larger individuals.

In the first embodiment of the present disclosure, shown in FIGS. 1-3, the array of magnets are compartmentalized and sandwiched between the flexible panel 15 of the blank 11 and a portion of the vest 12 (the vest 12 defines a mating or opposing flexible panel). In other embodiments, a blank could be formed to include three portions. In such an embodiment, the array of magnets could be sandwiched between the first and second portions of the blank. Further, a plate could be sandwiched between the second and third portions of the blank. Such an embodiment could have one or more zipper portions to be used in mounting the magnetic article holder to an article of clothing, such as, by way of example and not limitation, a vest.

It is further noted that attaching arrangements other than zippers can be employed in other embodiments of the present disclosure. For example, hook and loop fasteners can be applied to releasibly interconnect a magnetic article holder to an article of clothing. In yet another embodiment, a magnetic article holder including one or magnets could be interconnected to an article of clothing by sandwiching a portion of the article of clothing between the magnetic article holder and a plate such as plate 20.

Figure 6:
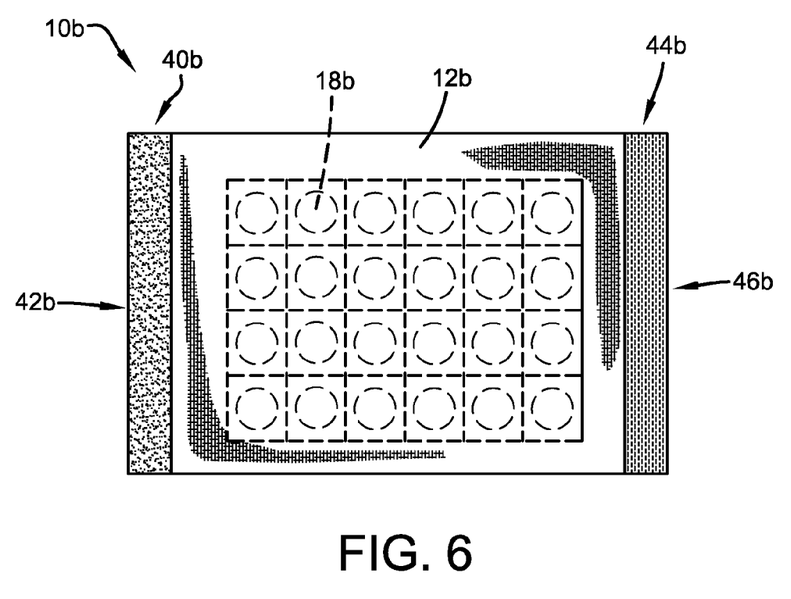
FIG. 6 is a front view of an additional exemplary embodiment of the present disclosure.
Figure 7:
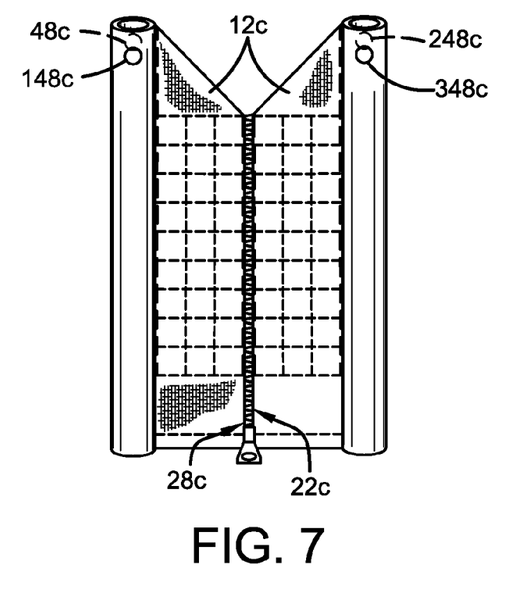
FIG. 7 is a perspective view of another exemplary embodiment of the present disclosure.

FIGS. 6-7 show additional embodiments including various approaches for fastening a magnetic article holder to an article of clothing. Referring now to FIG. 6, a magnetic article holder 10b can include a front or first panel 12b (the panel 12b is not part of a vest). The magnetic article holder 10b can also include second and third panels which are not visible in FIG. 6. The magnetic article holder 10b can also include a plurality of magnets, such as magnet 18b. The magnetic article holder 10b can also include a plate which is not visible in FIG. 6.

The magnetic article holder 10b can also include at least one fastening member in the form of a first fastening member 40b positioned on a first side 42b of the first flexible panel 12b and the second flexible panel and a second fastening member 44b positioned on a second side 46b of the first flexible panel 12b and the second flexible panel opposite the first side 42b. The exemplary first fastening member 40b and the exemplary second fastening member 44b are one of a hook tape assembly and a loop tape assembly. Hook and loop fasteners utilize hook fasteners on one side and loops on the other. A hook tape assembly can be a strip of hook fasteners arranged together. A loop tape assembly can be a strip of loop fasteners arranged together. The fastening members 40b, 44b can be engageable with mating fastening members mounted on an article of clothing. For example, the magnetic article holder 10b can be mounted on the inside of a jacket or vest having strips of hook or loop tape assemblies. Alternatively, the fastening members 40b, 44b could be folded over and mounted on the outside of a jacket or vest or shirt. The magnetic article holder 10b could be sized to be mounted on an arm or a leg. In such an embodiment, the fastening members 40b and 46b could engage one another.

Referring now to FIG. 7, a magnetic article holder 10c can include a front or first panel 12c (the panel 12c is not part of a vest). The magnetic article holder 10c can also include a second panel 15c and a third panel 13c. The magnetic article holder 10c can also include a plurality of magnets, such as magnet 18c. The magnetic article holder 10c can also include a plate 20c.

The magnetic article holder 10c can also include at least one fastening member in the form of a first fastening member 40c positioned on a first side 42c of the first flexible panel 12c and the second flexible panel and a second fastening member 44c positioned on a second side 46c of the first flexible panel 12c and the second flexible panel opposite the first side 42c. The exemplary first fastening member 40c and the exemplary second fastening member 44c are sleeves extending a full length of at least one edge of one of the first flexible panel 12c and the second flexible panel 15c. The fastening members 40c, 44c can be engageable with structures associated with an article of clothing. For example, the magnetic article holder 10c can be mounted on suspenders or a belt.

The magnetic article holder 10c can include a second plurality of magnets 48c, 148c, 248c, 348c mounted in the sleeves 40c, 44c. The magnets 48c and 148c can become magnetically engaged to affix the sleeve 40c to an article of clothing such as a suspender. Similarly, the magnets 248c and 3148c can become magnetically engaged to affix the sleeve 40c to an article of clothing. The inside surfaces of the sleeves 40c, 44c can be formed from a material to enhance friction between the sleeves 40c, 44c and articles of clothing.

Referring again to FIGS. 4A and 4B, magnetic article holder 10a can also include at least one fastening member in the form of a first fastening member 40a positioned on a first side 42a of a first flexible panel 12a and the second flexible panel and a second fastening member 44a positioned on a second side 46a of the first flexible panel 12a and the second flexible panel opposite the first side 42a. The exemplary first fastening member 40a and the exemplary second fastening member 44a are zipper tape assemblies. A zipper tape assembly is one-half of a zipper and includes a tape, teeth, a top stop, and either a pin or a box at the bottom.

While the present disclosure has been described with reference to an exemplary embodiment, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the appended claims. The right to claim elements and/or sub-combinations that are disclosed herein as other inventions in other patent documents is hereby unconditionally reserved.

What is claimed is:

1. A magnetic article holder comprising:
   a first flexible panel having a first outer surface and first inner surface opposite said first outer surface;
   a second flexible panel having a second outer surface and second inner surface opposite said second outer surface;
   a plurality of pockets defined between said first inner surface and said second outer surface, wherein said plurality of pockets are at least partially isolated from one another;
   a first plurality of magnets each respectively positioned in one of said plurality of pockets;
   a plate spaced from said first outer surface, said plate magnetically engaged with each of said first plurality of magnets; and
   a third flexible panel having a third outer surface and third inner surface opposite said third outer surface, wherein said plate is positioned between said second inner surface and said third outer surface.

2. The magnetic article holder of claim 1 wherein said second flexible panel and said third flexible panel are affixed together along a substantially continuous perimeter.

3. The magnetic article holder of claim 1 wherein said second flexible panel and said third flexible panel are affixed together along a discontinuous perimeter.

4. The magnetic article holder of claim 1 wherein said second flexible panel and said third flexible panel are affixed together with stitching.

5. The magnetic article holder of claim 1 wherein said first flexible panel and said second flexible panel and said third flexible panel are affixed together with stitching.

6. A magnetic article holder comprising:
   a first flexible panel having a first outer surface and first inner surface opposite said first outer surface;
   a second flexible panel having a second outer surface and second inner surface opposite said second outer surface;
   a plurality of pockets defined between said first inner surface and said second outer surface, wherein said plurality of pockets are at least partially isolated from one another;
   a first plurality of magnets each respectively positioned in one of said plurality of pockets;
   a plate spaced from said first outer surface, said plate magnetically engaged with each of said first plurality of magnets; and
   wherein said first flexible panel and said second flexible panel are affixed together with stitching.

7. A magnetic article holder comprising:
   a first flexible panel having a first outer surface and first inner surface opposite said first outer surface;
   a second flexible panel having a second outer surface and second inner surface opposite said second outer surface;
   a plurality of pockets defined between said first inner surface and said second outer surface, wherein said plurality of pockets are at least partially isolated from one another;
   a first plurality of magnets each respectively positioned in one of said plurality of pockets;
   a plate spaced from said first outer surface, said plate magnetically engaged with each of said first plurality of magnets; and
   wherein said first flexible panel and said second flexible panel are integrally-formed with respect to one another and folded over one another.

8. A magnetic article holder comprising:
   a first flexible panel having a first outer surface and first inner surface opposite said first outer surface;
   a second flexible panel having a second outer surface and second inner surface opposite said second outer surface;
   a plurality of pockets defined between said first inner surface and said second outer surface, wherein said plurality of pockets are at least partially isolated from one another;
   a first plurality of magnets each respectively positioned in one of said plurality of pockets;
   a plate spaced from said first outer surface, said plate magnetically engaged with each of said first plurality of magnets;
   at least one fastening member configured to fasten said first flexible panel and said second flexible panel to another structure; and
   wherein said at least one fastening member is further defined as a zipper tape assembly.

9. A magnetic article holder comprising:
   a first flexible panel having a first outer surface and first inner surface opposite said first outer surface;
   a second flexible panel having a second outer surface and second inner surface opposite said second outer surface;
   a plurality of pockets defined between said first inner surface and said second outer surface, wherein said plurality of pockets are at least partially isolated from one another;
   a first plurality of magnets each respectively positioned in one of said plurality of pockets;
   a plate spaced from said first outer surface, said plate magnetically engaged with each of said first plurality of magnets;
   at least one fastening member configured to fasten said first flexible panel and said second flexible panel to another structure; and
   wherein said at least one fastening member is further defined as one of a hook tape assembly and a loop tape assembly.

10. A magnetic article holder comprising:
    a first flexible panel having a first outer surface and first inner surface opposite said first outer surface;
    a second flexible panel having a second outer surface and second inner surface opposite said second outer surface;
    a plurality of pockets defined between said first inner surface and said second outer surface, wherein said plurality of pockets are at least partially isolated from one another;
    a first plurality of magnets each respectively positioned in one of said plurality of pockets;
    a plate spaced from said first outer surface, said plate magnetically engaged with each of said first plurality of magnets;
    at least one fastening member configured to fasten said first flexible panel and said second flexible panel to another structure; and
    wherein said at least one fastening member is further defined as a sleeve.

11. The magnetic article holder of claim 10 further comprising:
    a second plurality of magnets mounted in said sleeve.

12. The magnetic article holder of claim 10 wherein said sleeve extends a full length of at least one edge of one of said first flexible panel and said second flexible panel.

13. A magnetic article holder comprising:
    a first flexible panel having a first outer surface and first inner surface opposite said first outer surface;
    a second flexible panel having a second outer surface and second inner surface opposite said second outer surface;
    a plurality of pockets defined between said first inner surface and said second outer surface, wherein said plurality of pockets are at least partially isolated from one another;
    a first plurality of magnets each respectively positioned in one of said plurality of pockets;

a plate spaced from said first outer surface, said plate magnetically engaged with each of said first plurality of magnets;

at least one fastening member configured to fasten said first flexible panel and said second flexible panel to another structure; and wherein said at least one fastening member further comprises:

a first fastening member positioned on a first side of said first flexible panel and said second flexible panel; and a second fastening member positioned on a second side of said first flexible panel and said second flexible panel opposite said first side.

14. The magnetic article holder of claim 13 wherein each of said first fastening member and said second fastening member is a zipper tape assembly.

15. The magnetic article holder of claim 13 wherein each of said first fastening member and said second fastening member is one of a hook tape assembly and a loop tape assembly.

16. The magnetic article holder of claim 13 wherein each of said first fastening member and said second fastening member is a sleeve extending a full length of at least one edge of one of said first flexible panel and said second flexible panel.

* * * * *